United States Patent
Agarwal et al.

(10) Patent No.: US 12,401,685 B2
(45) Date of Patent: Aug. 26, 2025

(54) METHODS FOR MITIGATING DDoS ATTACK USING HARDWARE DEVICE AND DEVICES THEREOF

(71) Applicant: F5, Inc., Seattle, WA (US)

(72) Inventors: Sandeep Agarwal, Seattle, WA (US); Pete Thornewell, Seattle, WA (US); Bruce Zurfluh, Seattle, WA (US); Judge K. Arora, Seattle, WA (US); Ravneet Dhaliwal, Seattle, WA (US)

(73) Assignee: F5, Inc., Seattle, WA (US)

(*) Notice: Subject to any disclaimer, the term of this patent is extended or adjusted under 35 U.S.C. 154(b) by 228 days.

(21) Appl. No.: 17/955,793

(22) Filed: Sep. 29, 2022

(65) Prior Publication Data
US 2023/0119260 A1 Apr. 20, 2023

Related U.S. Application Data

(60) Provisional application No. 63/255,761, filed on Oct. 14, 2021.

(51) Int. Cl.
*H04L 9/40* (2022.01)
*H04L 67/146* (2022.01)

(52) U.S. Cl.
CPC ........ *H04L 63/1458* (2013.01); *H04L 63/126* (2013.01); *H04L 67/146* (2013.01)

(58) Field of Classification Search
CPC .. H04L 63/1458; H04L 63/126; H04L 67/146
See application file for complete search history.

(56) References Cited

U.S. PATENT DOCUMENTS

| | | | |
|---|---|---|---|
| 4,783,828 A | 11/1988 | Sadjadi | |
| 6,118,893 A | 9/2000 | Li | |
| 6,537,488 B1 | 3/2003 | Okumura et al. | |
| 6,748,056 B1 | 6/2004 | Bapriotti | |

(Continued)

FOREIGN PATENT DOCUMENTS

| | | |
|---|---|---|
| CN | 109 391 600 A | 2/2019 |
| CN | 110 365 712 A | 10/2019 |
| WO | WO 02/35860 A1 | 5/2002 |

OTHER PUBLICATIONS

Improving Syncookies (Year: 2008).*

(Continued)

*Primary Examiner* — Shirley X Zhang
(74) *Attorney, Agent, or Firm* — Troutman Pepper Locke LLP

(57) ABSTRACT

Methods, non-transitory computer readable media, network traffic manager apparatuses, and systems that assist with mitigating DDoS attack using a hardware device includes determining when a received network packet in an established connection between a client and a destination server includes a connection identifier cookie. A connection validation cookie is generated based on at least data in the received network packet, when the determination indicates the received network packet includes the connection identifier cookie. The connection identifier cookie is compared against the generated connection validation cookie. The (Continued)

received network packet is dropped when the comparison indicates the connection validation cookie fails to match the connection identifier cookie.

20 Claims, 8 Drawing Sheets

(56) References Cited

U.S. PATENT DOCUMENTS

| | | | |
|---|---|---|---|
| 6,769,066 | B1 | 7/2004 | Botros |
| 7,228,412 | B2 | 6/2007 | Freed |
| 7,406,606 | B2 | 7/2008 | Chawla |
| 7,441,429 | B1 | 10/2008 | Nucci |
| 7,519,834 | B1 | 4/2009 | Dondeti |
| 7,568,224 | B1 * | 7/2009 | Jennings ............... H04L 63/126 713/161 |
| 7,624,447 | B1 | 11/2009 | Horowitz |
| 7,743,415 | B2 | 6/2010 | Poletto et al. |
| 8,572,733 | B1 | 10/2013 | Rockwood |
| 8,578,482 | B1 | 11/2013 | Yang |
| 8,756,684 | B2 | 6/2014 | Frantz |
| 8,886,620 | B1 | 11/2014 | Mukerji |
| 8,943,588 | B1 | 1/2015 | Speegle |
| 9,032,519 | B1 | 5/2015 | Maher |
| 9,077,709 | B1 | 7/2015 | Dall |
| 9,203,837 | B2 | 12/2015 | Pierson |
| 9,578,055 | B1 | 2/2017 | Khanal |
| 9,628,499 | B1 | 4/2017 | Yu |
| 9,654,485 | B1 | 5/2017 | Neumann |
| 9,900,344 | B2 | 2/2018 | Smith |
| 9,942,250 | B2 | 4/2018 | Stiansen |
| 9,948,629 | B2 | 4/2018 | Eisen |
| 9,967,250 | B2 | 5/2018 | Johansson |
| 10,050,792 | B1 | 8/2018 | Johnson |
| 10,237,298 | B1 | 3/2019 | Nguyen |
| 10,397,250 | B1 | 8/2019 | Shemesh |
| 10,693,901 | B1 | 6/2020 | Chan |
| 11,228,609 | B1 * | 1/2022 | Finkelshtein ....... H04L 63/1416 |
| 11,336,575 | B1 | 5/2022 | Milley et al. |
| 2002/0116615 | A1 | 8/2002 | Nguyen |
| 2003/0042439 | A1 | 3/2003 | Rusu |
| 2003/0073091 | A1 | 4/2003 | Krylov |
| 2003/0145232 | A1 | 7/2003 | Poletto |
| 2003/0199762 | A1 | 10/2003 | Fritz |
| 2004/0037326 | A1 | 2/2004 | D'Souza et al. |
| 2004/0103283 | A1 | 5/2004 | Hornak |
| 2004/0170123 | A1 | 9/2004 | Carpenter |
| 2005/0027846 | A1 | 2/2005 | Nolfe |
| 2005/0111367 | A1 | 5/2005 | Chao |
| 2005/0195840 | A1 | 9/2005 | Krapp |
| 2005/0198519 | A1 | 9/2005 | Tamura |
| 2006/0031483 | A1 | 2/2006 | Lund |
| 2006/0031928 | A1 | 2/2006 | Conley |
| 2007/0014276 | A1 | 1/2007 | Bettink |
| 2007/0118894 | A1 | 5/2007 | Bhatia |
| 2007/0280114 | A1 | 12/2007 | Chao |
| 2007/0294187 | A1 | 12/2007 | Scherrer |
| 2008/0028467 | A1 | 1/2008 | Kommareddy |
| 2008/0263215 | A1 | 10/2008 | Schnellbaecher |
| 2008/0320567 | A1 | 12/2008 | Shulman |
| 2009/0024737 | A1 | 1/2009 | Goldspink |
| 2009/0199297 | A1 | 8/2009 | Jarrett |
| 2010/0031315 | A1 | 2/2010 | Feng |
| 2010/0070451 | A1 | 3/2010 | Hugues |
| 2010/0284282 | A1 | 11/2010 | Solie |
| 2010/0325418 | A1 | 12/2010 | Kanekar |
| 2011/0012586 | A1 | 1/2011 | Montanar |
| 2011/0072516 | A1 | 3/2011 | Cohen |
| 2011/0154026 | A1 | 6/2011 | Edstrom |
| 2011/0264905 | A1 | 10/2011 | Ovvsiannikov |
| 2012/0051236 | A1 | 3/2012 | Hegde |
| 2012/0079592 | A1 | 3/2012 | Pandrangi |
| 2012/0117239 | A1 | 5/2012 | Holloway |
| 2012/0144487 | A1 | 6/2012 | Kim |
| 2012/0167210 | A1 | 6/2012 | Oro |
| 2012/0173710 | A1 | 7/2012 | Rodriguez |
| 2012/0227106 | A1 | 9/2012 | Shulman |
| 2012/0323700 | A1 | 12/2012 | Aleksandrovich |
| 2013/0080407 | A1 | 3/2013 | Levow |
| 2013/0263268 | A1 | 10/2013 | Kim |
| 2013/0276114 | A1 | 10/2013 | rFiedrichs |
| 2013/0305365 | A1 | 11/2013 | Rubin |
| 2014/0095865 | A1 | 4/2014 | Yerra |
| 2014/0289854 | A1 | 9/2014 | Mahvi |
| 2014/0298419 | A1 | 10/2014 | Boubez |
| 2014/0310805 | A1 | 10/2014 | Kandekar |
| 2014/0317739 | A1 | 10/2014 | Be'ery et al. |
| 2015/0067328 | A1 | 3/2015 | Yin |
| 2015/0088662 | A1 | 3/2015 | Moller |
| 2015/0163234 | A1 | 6/2015 | Tal |
| 2015/0215334 | A1 | 7/2015 | Bingham |
| 2015/0271179 | A1 | 9/2015 | Nang |
| 2015/0295945 | A1 | 10/2015 | Canzanese |
| 2015/0310196 | A1 | 10/2015 | Turgeman |
| 2016/0021084 | A1 | 1/2016 | Eisen |
| 2016/0021117 | A1 | 1/2016 | Harmon |
| 2016/0127406 | A1 | 5/2016 | Smith |
| 2016/0182542 | A1 | 6/2016 | Staniford |
| 2016/0337314 | A1 | 11/2016 | Yu |
| 2017/0171231 | A1 | 6/2017 | Reybok, Jr. |
| 2017/0249306 | A1 | 8/2017 | Alien |
| 2017/0318053 | A1 | 11/2017 | Singh |
| 2018/0124073 | A1 | 5/2018 | Scherman |
| 2018/0124300 | A1 | 5/2018 | Brook |
| 2018/0139228 | A1 * | 5/2018 | Kanakarajan ......... H04L 63/123 |
| 2018/0165457 | A1 | 6/2018 | Holz |
| 2020/0296125 | A1 | 9/2020 | Alderson |
| 2020/0351244 | A1 | 11/2020 | Moore |
| 2021/0075790 | A1 * | 3/2021 | Hebert ................. H04L 63/101 |
| 2022/0121362 | A1 | 4/2022 | Liu |
| 2023/0016035 | A1 * | 1/2023 | Mykytianskyi ......... H04L 63/20 |
| 2023/0146962 | A1 | 5/2023 | Reddy et al. |
| 2024/0265057 | A1 | 8/2024 | Kol |
| 2024/0283674 | A1 | 8/2024 | Konda |
| 2024/0291744 | A1 | 8/2024 | Chhabra |
| 2024/0291745 | A1 | 8/2024 | Chhabra |
| 2025/0007835 | A1 | 1/2025 | Chhabra |
| 2025/0007937 | A1 | 1/2025 | Mittal |
| 2025/0148034 | A1 | 5/2025 | Shribman |
| 2025/0159039 | A1 | 5/2025 | Shribman |

OTHER PUBLICATIONS

Online discussion forum on F5 Network's website—Software SYN cookies without a TCP timestamp include TCP Options that are not encoded. (Year: 2018).*

BIG-1P® Analytics: Implementations, version 11.3, Nov. 15, 2012, F5 Networks, Inc., pp. 1-40.

F5 Networks, "BIG-1 P Local Traffic Manager: Concepts", version 11.4, pp. 1-178, retrieved from https://support.f5.comkb/en-us/products/bigipltm/manuals/producl/ltm-concepts-11-4-0 .html on Feb. 12, 2015.

F5 Networks, "BIG-1P Local Traffic Manager: Implementations", version 11.4, pp. 1-234, retrieved from https://support.5 .com/kb/en-us/products/bigipltm/manuals/product/ltm-implementations-11-4-0 .html on Feb. 12, 2015.

F5 Networks, "BIG-1 P Local Traffic Manager: Monitors Reference", version 11.4, pp. 1-106, retrieved from hllps://support. f5 .com/kb/en-us/products/big-ip ltm/manuals/producl/ltm-monitorsreference-11-4-0 .html on Feb. 12, 2015.

F5 Networks, "Operations Guide 1.0 F5 Local Traffic Manager and Global Traffic Manager", pp. 1.144, retrieved from hllps://support. f5 .com/kb/en-us/products/bigipltm/manuals/product/f5-1 tm-gtm-operations-guide-1--0 .html on Feb. 12, 2015.

F5 Networks, "Release Note: Big-IP L TM and TMOS", version 11.4.1, pp. 1-58, retrieved from hllps://support.f5.com/kb/en-us/products/bigipltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

(56) References Cited

OTHER PUBLICATIONS

F5 Networks, Inc., "BIG-IP ASM 11.5.0", Release Notes, Apr. 12, 2016, Version 11.5.0.
F5 Networks, Inc., "BIG-IPASM", Release Notes, Jun. 13, 2016, pp. 1-18, version 11.6.1 F5 Networks, Inc.
F5 Networks, Inc., "BIG-IP® Analytics: Implementations", Manual, Jan. 31, 2014, pp. 1-50, Version 11.5.
F5 Networks, Inc., "BIG-IP® Analytics: Implementations", Manual, Aug. 25, 2014, pp. 1-62, v11.6, F5 Networks, Inc.
F5 Networks, Inc., "BIG-IP® Application Security Manager TM: Getting Started", Manual, Aug. 25, 2014, pp. 1-78, version 11.6, F5 Networks, Inc.
F5 Networks, Inc., "BIG-IP® Application Security Manager TM: Implementations", Manual, Aug. 25, 2014, pp. 1-420, version 11.6, F5 Networks, Inc.
F5 Networks, Inc., "BIG-IP® Application Security ManagerTM: Implementations", Manual, Jan. 31, 2014, pp. 1-396, Version 11.5.
F5 Networks, Inc., "BIG-IP® Application Security ManagerTM:Implementations", F5 Networks, Inc., Dec. 10, J014, version 11.6, pp. 1-420.
F5 Networks, Inc., "BIG-IP® Local Traffic Management: Basics", Manual, Aug. 25, 2014, pp. 1-74, version 11.6, F5 Networks, Inc.
F5 Networks, Inc., "BIG-IP® Network Firewall: Policies and Implementations", Manual, Aug. 10, 2016, pp. 1-166, ,11.6, F5 Networks, Inc.
F5 Networks, Inc., "BIG-IP® Systems: DoS Protection and Protocol Firewall Implementations", Manual, Aug. 25, 2014, pp. 1-108, v11.6, F5 Networks, Inc.
F5 Networks, Inc., "BIG-IP® TMOS®: Concepts", Manual, Nov. 11, 2014, pp. 1-148, Version 11.5.
F5 Networks, Inc., "BIG-IP® TMOS®: Implementations", Manual, Jan. 31, 2014, pp. 1-274, Version 11.5.
F5 Networks, Inc., "F5 BIG-IP TMOS: Operations Guide", Manual, Mar. 5, 2015, pp. 1-276 version 11.6, F5 Networks, Inc.
r5 Networks, Inc., "BIG-IP Application Security Manager: Implementations", F5 Networks, Inc., Dec. 10, 2014, version 11.6, pp. 1-420.
F5 Networks, Inc., "BIG-IP® Application Security Manager™: Implementations", Manual, Nov. 10, 2017, pp. 1-348, version 13.0, F5 Networks, Inc.
European Search Report Dated Feb. 17, 2025. European Patent Appln No. 24216113.1.
International Search Report dated Mar. 25, 2024 issued in International Application No. PCT/US2023/083393.
European Search Report Date Dec. 18, 2024. European Patent Application No. 24193938.8.

\* cited by examiner

|  | Client 12(1) |  | Network Traffic Manager Apparatus 14 |
|---|---|---|---|
| 1. | CLOSED |  | LISTEN |
| 2. | SYN-SENT | --> <SEQ=100><SYN> | --> SYN-RECEIVED |
| 3. | SYN-RCVD | <-- <SEQ=90><ACK=101><SYN,ACK,TSv=1:0> | <-- SYN-SENT/RCVD |
| 4. | ESTBLSHD | --> <SEQ=101><ACK=91><ACK,TSv=20,TSe=1:0> | --> ESTBLSHD |
| 5. | ESTBLSHD | <-- <SEQ=91><ACK=102><ACK,TSv=2:0,TSe=20> | --> ESTBLSHD |

FIG. 4

_METHODS FOR MITIGATING DDoS ATTACK USING HARDWARE DEVICE AND DEVICES THEREOF_

CROSS-REFERENCE TO RELATED APPLICATIONS

This application claims priority to U.S. Provisional Patent Application No. 63/255,761, filed Oct. 14, 2021, which is incorporated by reference herein in its entirety.

FIELD

This technology relates to methods and systems for mitigating distributed denial of service attack (DDoS) using a hardware device with the network traffic manager apparatus.

BACKGROUND

A hostile attack is a Denial of Service (DDOS) attack. A Dos attack is an attempt to overload a server's ability to respond by means of flooding it with requests for service. Various methods have been devised to mitigate a DDoS attack. The problem with these methods is that these methods do not drop spurious network packets without storing state information associated with the connection or requiring the processor or the FPGA to perform complex operations, such as to frequently store and access an entire connection table for each network packet.

SUMMARY

A method for mitigating distributed denial of service attack (DDoS) using a hardware device with the network traffic manager apparatus, implemented in cooperation with a cloud service or a network traffic management system comprising one or more network traffic management modules, server modules, or client modules, includes determining when a received network packet in an established connection between a client and a destination server includes a connection identifier cookie. A connection validation cookie is generated based on at least data in the received network packet, when the determination indicates the received network packet includes the connection identifier cookie. The connection identifier cookie is compared against the generated connection validation cookie. The received network packet is dropped when the comparison indicates the connection validation cookie fails to match the connection identifier cookie.

A network traffic management apparatus including memory including programmed instructions stored thereon and one or more processors configured to be capable of executing the stored programmed instructions to determine when a received network packet in an established connection between a client and a destination server includes a connection identifier cookie. A connection validation cookie is generated based on at least data in the received network packet, when the determination indicates the received network packet includes the connection identifier cookie. The connection identifier cookie is compared against the generated connection validation cookie. The received network packet is dropped when the comparison indicates the connection validation cookie fails to match the connection identifier cookie.

A non-transitory computer readable medium having stored thereon instructions for including executable code that, when executed by one or more processors, causes the processors to determine when a received network packet in an established connection between a client and a destination server includes a connection identifier cookie. A connection validation cookie is generated based on at least data in the received network packet, when the determination indicates the received network packet includes the connection identifier cookie. The connection identifier cookie is compared against the generated connection validation cookie. The received network packet is dropped when the comparison indicates the connection validation cookie fails to match the connection identifier cookie.

A network traffic management system includes one or more traffic management modules, server modules, or client modules, memory comprising programmed instructions stored thereon, and one or more processors configured to be capable of executing the stored programmed instructions to determine when a received network packet in an established connection between a client and a destination server includes a connection identifier cookie. A connection validation cookie is generated based on at least data in the received network packet, when the determination indicates the received network packet includes the connection identifier cookie. The connection identifier cookie is compared against the generated connection validation cookie. The received network packet is dropped when the comparison indicates the connection validation cookie fails to match the connection identifier cookie.

This technology provides a number of advantages including providing methods, non-transitory computer readable media, network traffic management apparatuses, and network traffic management systems that help to mitigate distributed denial of service attack using a hardware device. This technology provides a number of advantages including mitigating distributed denial of service attack using a hardware device.

BRIEF DESCRIPTION OF THE DRAWINGS

FIG. 4 is an exemplary illustration of a network traffic manager apparatus performing a three-way TCP handshake;

DETAILED DESCRIPTION

Figure 1:
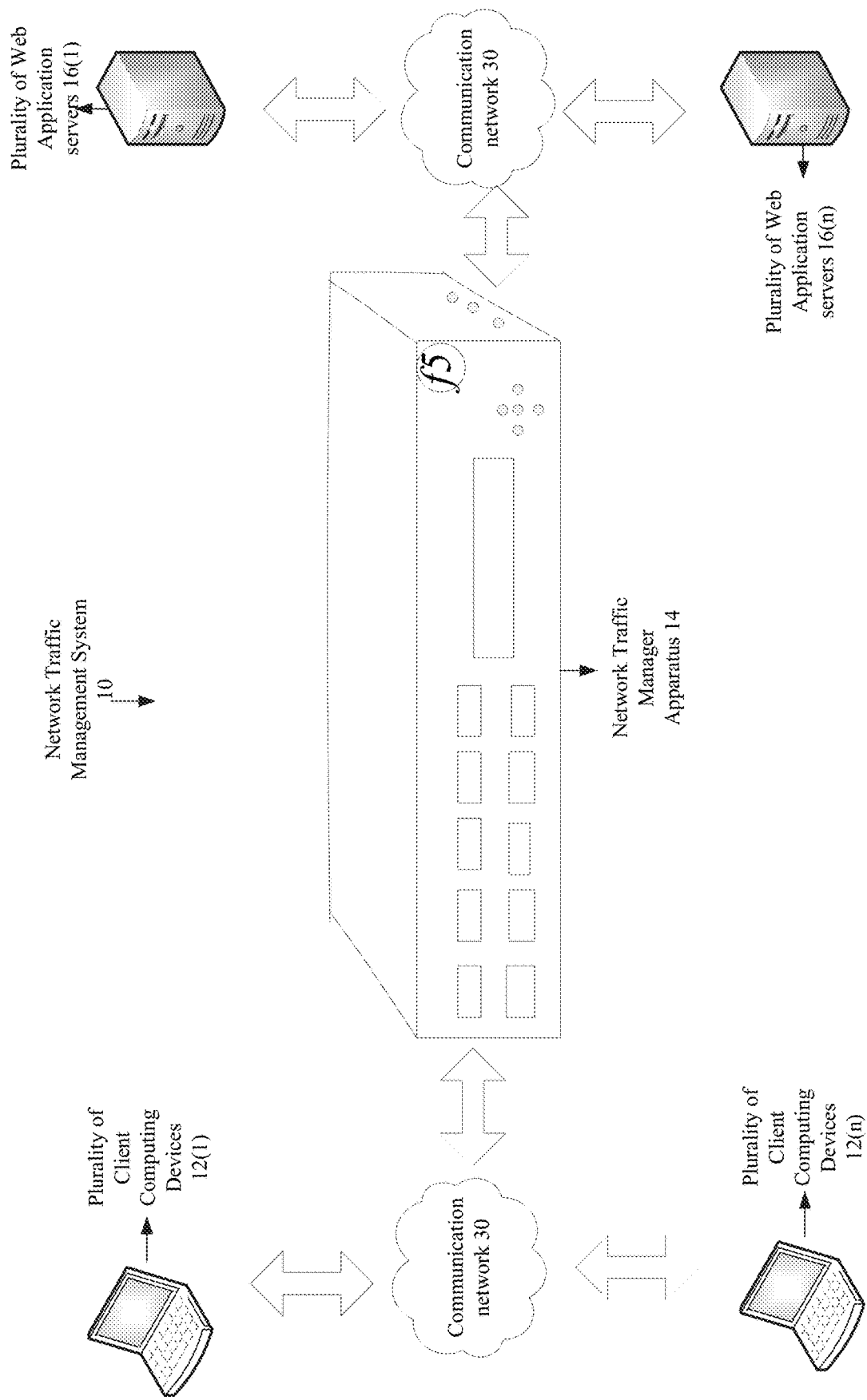
FIG. 1 is block diagram of an exemplary network traffic management system with a network traffic management apparatus.
Figure 2:
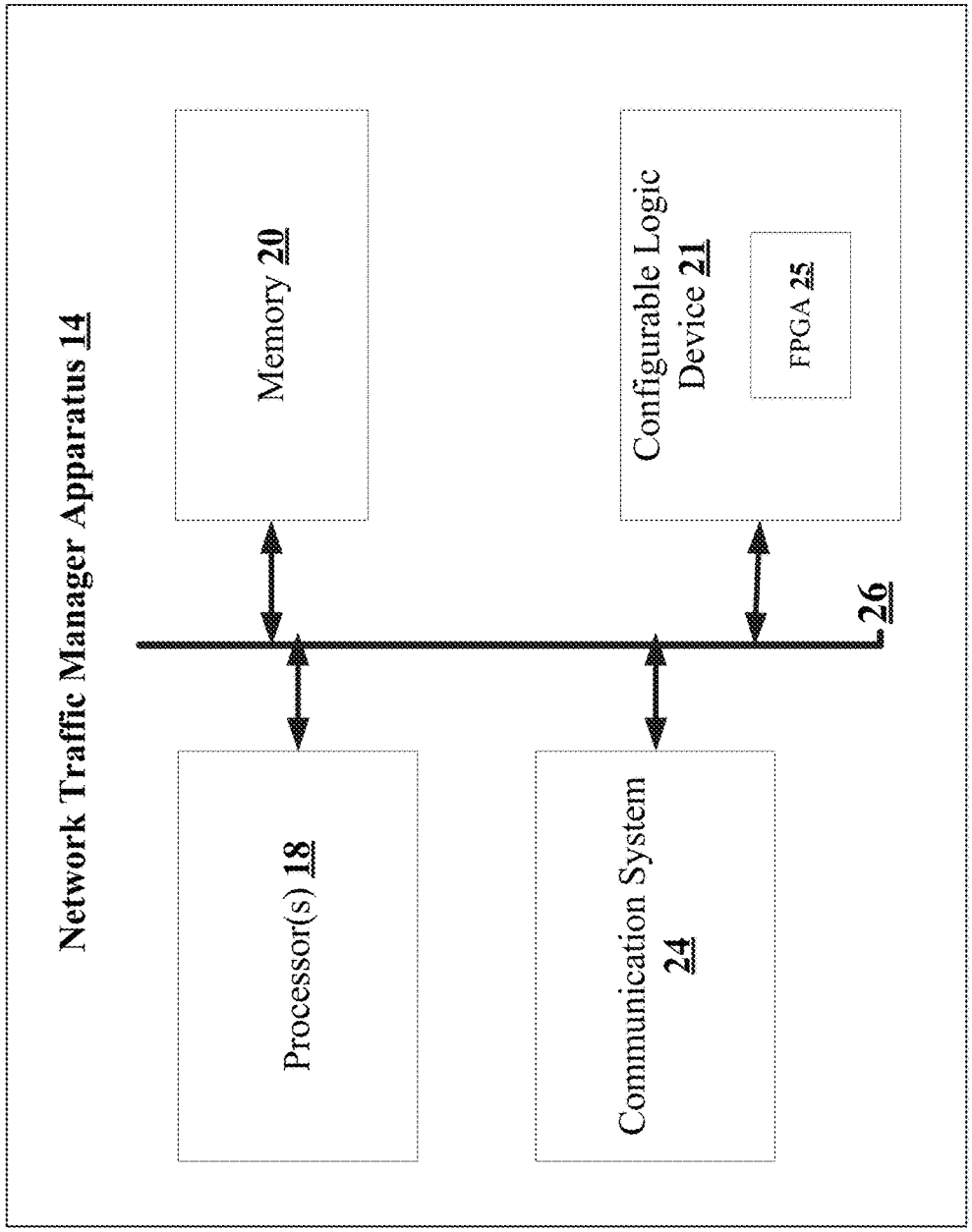
FIG. 2 is a block diagram of an exemplary network traffic manager apparatus.

An example of a network environment 10 which incorporates a network traffic management system for mitigating distributed denial of service attack (DDoS) using a hardware device with the network traffic manager apparatus 14 is illustrated in FIGS. 1 and 2. The exemplary environment 10 includes a plurality of client computing devices 12(1)-12(n), a network traffic manager apparatus 14, and a plurality of web application servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including mitigating distributed denial of service attack using a hardware device.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of web application servers 16(1)-16(n) through the communication network 30, although the web application servers 16(1)-16(n) and the network traffic manager apparatus 14 may be coupled together via other topologies.

The network traffic manager apparatus 14 assists with mitigating distributed denial of service attack using a hardware device as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
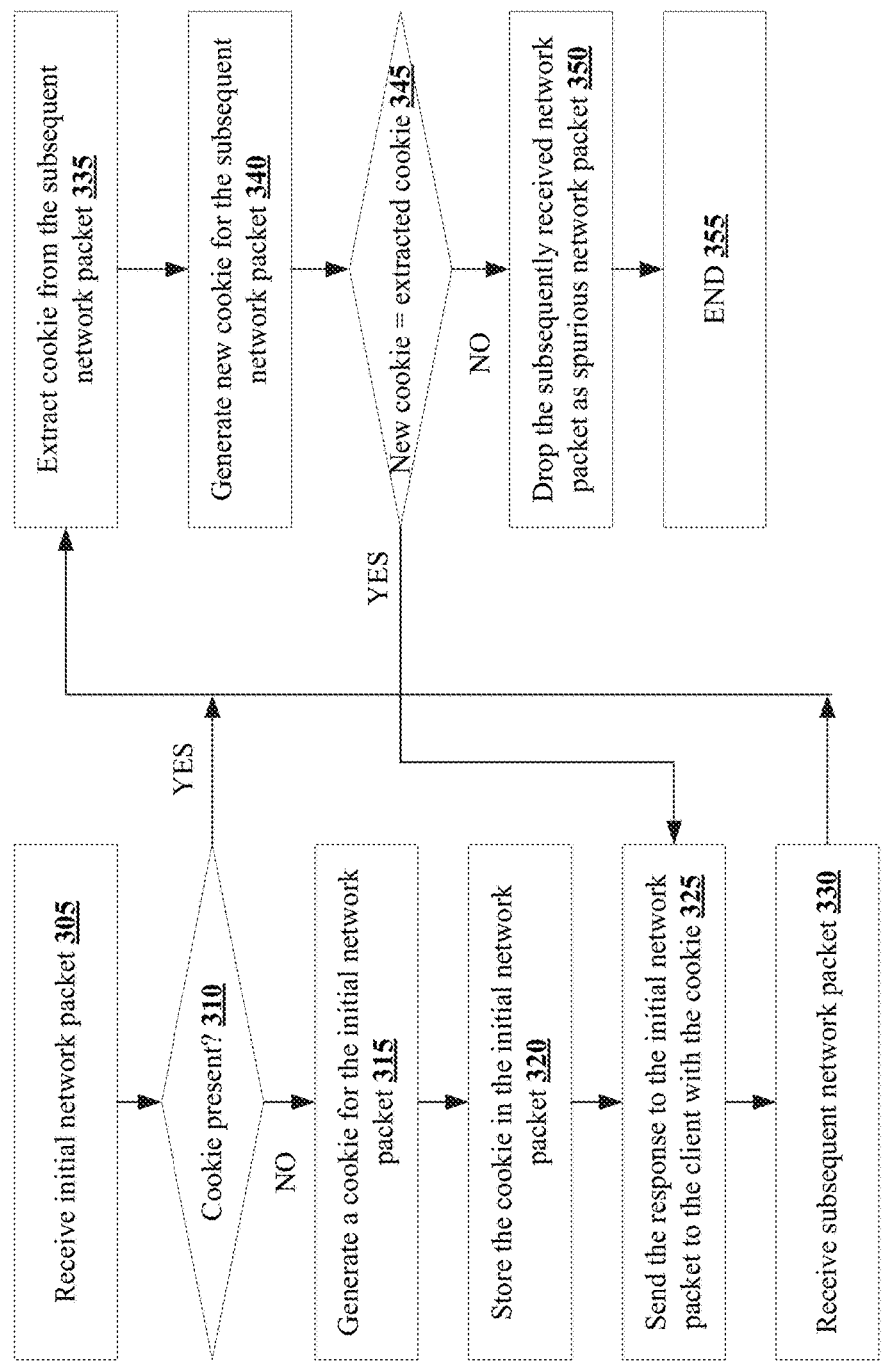
FIG. 3 is a flowchart of an exemplary method for mitigating distributed denial of service attack.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIG. 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays 25 ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n), and the plurality of web application servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

Each of the plurality of web application servers 16(1)-16(n) of the network traffic management system include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of applications requested by the plurality of client computing devices 12(1)-12(n), or the network traffic manager apparatus 14. The plurality of web application servers 16(1)-16(n) may provide data or receive data in response to requests directed toward the respective applications on the plurality web application servers 16(1)-16(n) from the plurality of client computing devices 12(1)-12(n) or the network traffic manager apparatus 14. It is to be understood that the plurality of web application servers 16(1)-16(n) may be hardware or software or may represent a system with multiple external resource servers, which may include internal or external networks. In this example the plurality of web application servers 16(1)-16(n) may be any version of Microsoft® IIS servers or Apache® servers, although other types of servers may be used.

Although the plurality of web application servers 16(1)-16(n) are illustrated as single servers, each of the plurality of web application servers 16(1)-16(n) may be distributed across one or more distinct network computing devices. Moreover, the plurality of web application servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of web application servers 16(1)-16(n) operate to manage and/or otherwise coordinate operations of the other network computing devices. The plurality of web application servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of web application servers 16(1)-16(n) depicted in FIG. 1 can operate within network traffic manager apparatus 14 rather than as a standalone server communicating with network traffic manager apparatus 14 via the communication network(s) 30. In this example the plurality of web application servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, plurality of web application servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the plurality of web application servers 16(1)-16(n), for example, may be configured to operate as virtual instances on the same physical machine. In other words, one or more of network traffic manager apparatus 14, the plurality of client computing devices 12(1)-12(n), or the plurality of web application servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of web application servers 16(1)-16(n) than depicted in FIG. 1. The plurality of client computing devices 12(1)-12(n), the plurality of web application servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Figure 5:
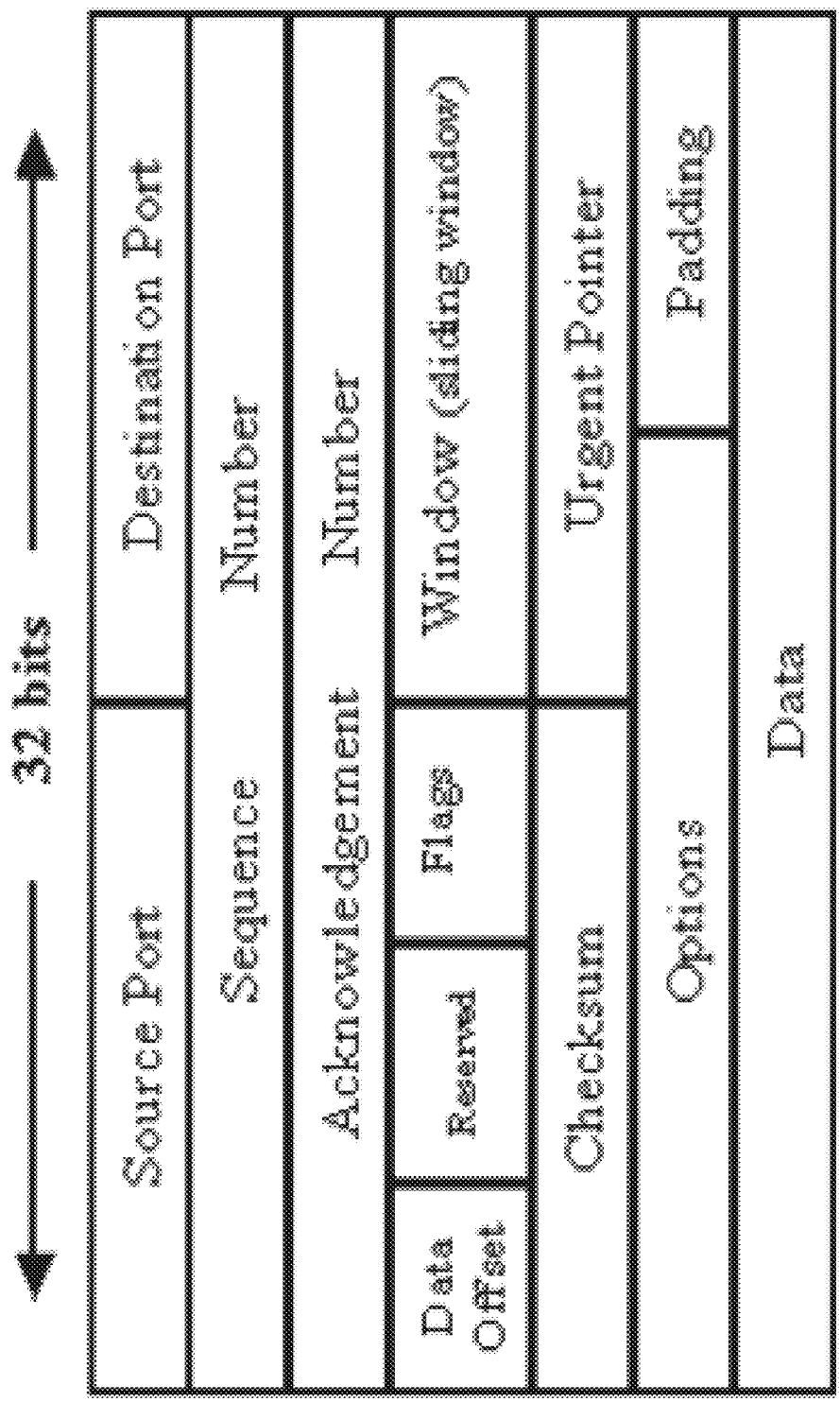
FIG. 5 is an exemplary illustration of a received TCP packet.

An example of a method for mitigating distributed denial of service attack will now be described with reference to FIGS. 1-8. The exemplary method begins at step 305 where the network traffic manager apparatus 14 receives a network packet from one of a plurality of client computing devices 12(1)-12(n), although the network traffic manager apparatus 14 can receive other types of information from other devices. In this example, prior to receiving an initial network packet, the requesting one of the plurality of client devices 12(1)-12(n) and the network traffic manager apparatus 14 performs a three-way TCP handshake as illustrated in FIG. 4 prior to sending the network packet. Upon completion of the TCP handshake, the network traffic manager apparatus 14 receives the TCP network packet, although other types of network packets using other types of protocols can be received by the network traffic manager apparatus 14 in other examples. An example of the TCP packet that is received is illustrated in FIG. 5, by way of example.

In step 310, the FPGA 25 within the network traffic manager apparatus 14 determines if there is a cookie present within a TCP timestamp data field within the received network packet, although the cookie could be stored in other fields within the network packet in other examples. Accordingly, if in step 310, the FPGA 25 determines that there is a cookie present within the received network packet, then Yes branch is taken to step 335. However, if in step 310, the FPGA 25 determines that there is no cookie present within the received network packet, then No branch is taken to step 315.

In step 315, the network traffic manager apparatus 14 generates a cookie for the received network packet. In this example, the FPGA 25 within the network traffic manager apparatus 14 is configured to generate the cookie using data within the received network packet, such as the source internet protocol (IP) address, destination IP address, source port, or destination port by way of example, although the network traffic manager apparatus 14 can use other types and/or combinations of data in the packet to generate the cookie. Additionally, in this example, the FPGA 25 within the network traffic manager apparatus 14 is configured to use a secret key that is stored within the memory 20, along with the data from the received network packet to generate the cookie. Although, in other examples, the network traffic manager apparatus 14 can use other types and combination of data to generate the cookie.

Figure 6:
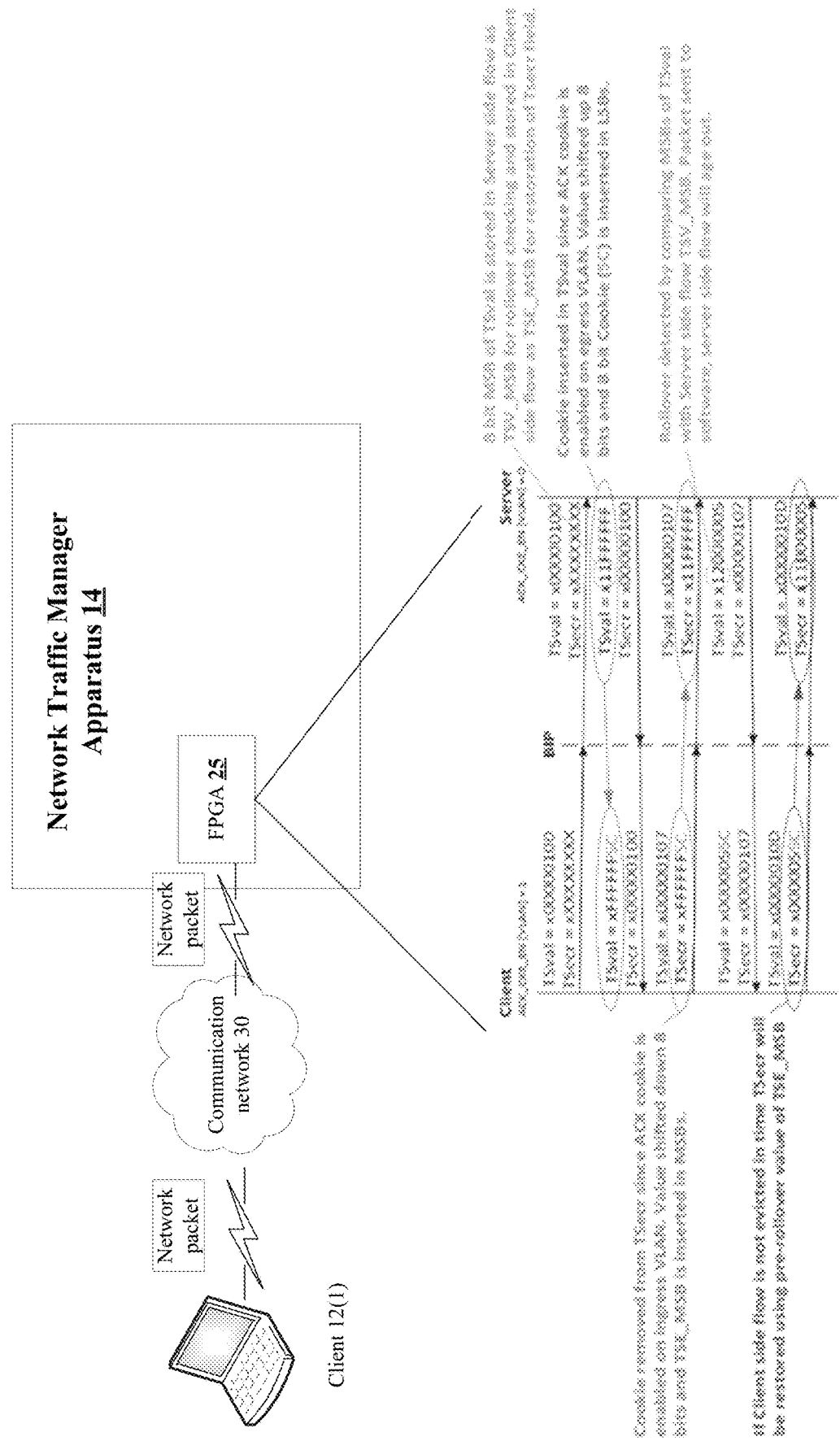
FIG. 6 is an exemplary illustration of a FPGA within a network traffic manager apparatus storing a generated cookie.

In step 320, the FPGA 25 within the network traffic manager apparatus 14 stores the generated cookie for received network packet in the TCP timestamp data field of the network packet, although the network traffic manager apparatus 14 can store generated cookie in other fields within the network packet. In this example, the FPGA 25 within the network traffic manager apparatus 14 stores the generated cookie so that the FGPA 25 can recognize whether a subsequent network packet that is received from the requesting one of the plurality of client computing devices 12(1)-12(n) is part of a network flow. An example, of the FPGA 25 within the network traffic manager apparatus 14 storing the generated cookie is illustrated in FIG. 6. In this example, the FPGA 25 within the network traffic manager apparatus 14 inserts the cookie into the 32 bit TSval field of the TCP packet by shifting up 8 most significant bits (MSBs) and inserting the cookie into the eight least significant bits. By way of example, if the cookie that is generated is 0xaa and the existing TSval in the TCP packet is 0x11ffffff, then the new TSval after inserting the cookie will be 0xffffffaa. In other words, the FPGA 25 stores the eight MSBs of TSval in the sister flow so that the FPGA can restore the TSecr field of the TCP packet. However, during a rollover when the server 16(1) sends a TSval of the TCP packet with eight MSBs not equal to 0x11, then FPGA 25 will restore the most significant bits of the TSecr field of the TCP packet with 0x11, even though it should now be 0x12.

Figure 7:
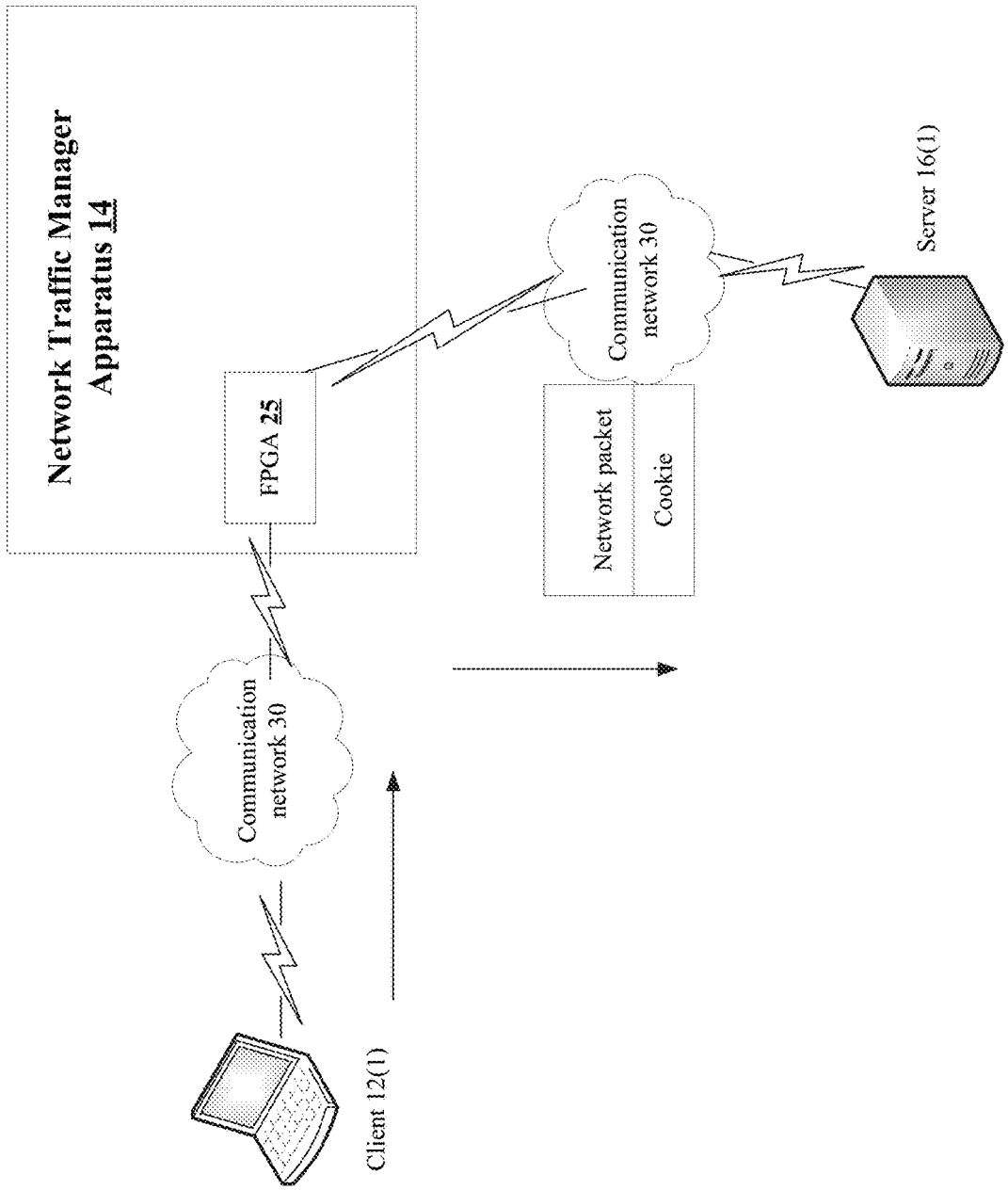
FIG. 7 is an exemplary illustration of a network traffic manager apparatus receiving and forward the response network packet with a cookie.
Figure 8:
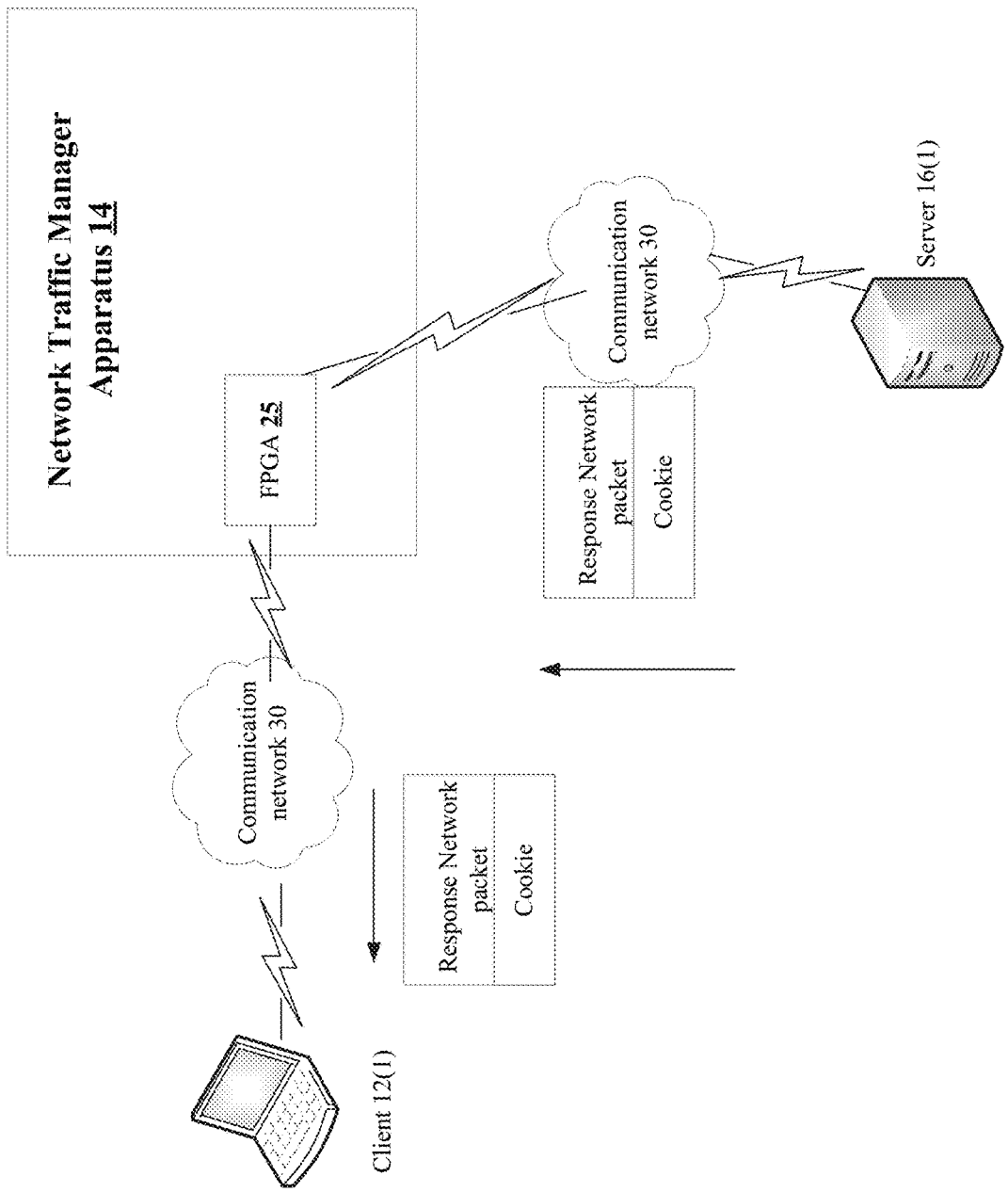
FIG. 8 is an exemplary illustration of a network traffic manager apparatus receiving and forward the response network packet with a cookie.

In step 325, the network traffic manager apparatus 14 receives a response packet in response to the transmission of the received packet to one of the plurality of servers 16(1)-16(n) and forwards the response packet with the generated cookie in the TSval field to the requesting one of the plurality of client devices 12(1)-12(n), although the network traffic manager apparatus 14 can send the received network packet to other devices. In this example, the network traffic manager apparatus 14 can obtain a response packet from one of the plurality of servers 16(1)-16(n) and send the response network packet to the requesting one of the plurality of client computing devices 12(1)-12(n) with the cookie that was generated in step 310. By way of example, the network traffic manager apparatus 14 receiving and forward the response network packet with the cookie is illustrated in FIGS. 7-8.

In step 330, the network traffic manager apparatus 14 receives a subsequent network packet from the requesting one of the plurality of client devices 12(1)-12(n). This subsequent network packet is a TCP network packet, although network packet with other protocols can also be received by the network traffic manager apparatus 14 in other examples.

In step 335, the FPGA 25 within the network traffic manager apparatus 14 extracts the cookie present within the TCP timestamp data field of the subsequent network packet, although the FPGA 25 within the network traffic manager apparatus 14 can extract the stored cookie from other fields of the subsequently received network packet.

In step 340, the FPGA 25 within the network traffic manager apparatus 14 generates a new cookie for the subsequently received network packet using the technique illustrated and described above in step 310, although other techniques to generate the new cookie may be used.

In step 345, the FPGA 25 within the network traffic manager apparatus 14 compares the newly generated cookie with the cookie that was extracted in step 335 to determine if there is an exact match. In this example, when the new cookie exactly matches with the extracted cookie, then the FPGA 25 within the network traffic manager apparatus 14 determines that the subsequently received network packet is part of an existing flow. On the contrary, if the FPGA 25 within the network traffic manager apparatus 14 determines that the new cookie is not an exact match with the extracted cookie, then FPGA 25 within the network traffic manager apparatus 14 determines that the subsequently received network packet is a spurious network packet (i.e., a network packet that initiates a denial of service attack). Accordingly, if the FPGA 25 within the network traffic manager apparatus 14 determines that there is an exact match between the new cookie and the extracted cookie, then the exemplary flow proceeds back to step 320 where the subsequently received network packet is sent to the destination. However, if the FPGA 25 within the network traffic manager apparatus 14 determines that the new cookie and the extracted cookie do not match, then the exemplary flow proceeds to step 350.

In step 350, the FPGA 25 within the network traffic manager apparatus 14 drops the subsequently received network packet. By dropping the subsequently received network packet, the disclosed technology is able to mitigate the denial of service attack on the plurality of servers 16(1)-16(n).

Accordingly, examples of this technology advantageously drop spurious network packets without storing state information associated with the connection or requiring the processor or the FPGA to perform complex operations, such as to frequently store and access an entire connection table for each network packet. In step 355, the exemplary method ends.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for mitigating distributed denial of service attack comprising one or more network traffic apparatuses, client devices, or server devices, the method comprising:
   determining when a received network packet in an established connection between a client and a destination server comprises a connection identifier cookie within a TCP timestamp data field in the received network packet;
   generating a connection validation cookie based on at least data in the received network packet, when the determination indicates the received network packet includes the connection identifier cookie;
   comparing the connection identifier cookie against the generated connection validation cookie; and
   dropping the received network packet when the comparison indicates the connection validation cookie fails to match the connection identifier cookie.

2. The method as set forth in claim 1 further comprising:
   receiving an initial network packet in the established connection;
   generating the connection identifier cookie based on at least data associated with an initial network packet of the established connection; and
   transmitting the connection identifier cookie to the client in the established connection.

3. The method as set forth in claim 2 wherein the connection validation cookie and the connection identifier cookie are each further generated based on a secret key.

4. The method as set forth in claim 1 further comprising, sending the received network packet to a destination device when the generated connection validation cookie exactly matches with the connection identifier cookie.

5. The method as set forth in claim 1 further comprising, extracting the connection identifier cookie prior from the subsequently received network packet to generating the connection validation cookie.

6. A non-transitory computer readable medium having stored thereon instructions for mitigating distributed denial of service attack executable code which when executed by one or more processors, causes the processors to:
   determine when a received network packet in an established connection between a client and a destination server comprises a connection identifier cookie within a TCP timestamp data field in the received network packet;
   generate a connection validation cookie based on at least data in the received network packet, when the determination indicates the received network packet includes the connection identifier cookie;
   compare the connection identifier cookie against the generated connection validation cookie; and
   drop the received network packet when the comparison indicates the connection validation cookie fails to match the connection identifier cookie.

7. The medium as set forth in claim 6 further comprising:
   receiving an initial network packet in the established connection;
   generating the connection identifier cookie based on at least data associated with an initial network packet of the established connection; and
   transmitting the connection identifier cookie to the client in the established connection.

8. The medium as set forth in claim 6 wherein the connection validation cookie and the connection identifier cookie are each further generated based on a secret key.

9. The medium as set forth in claim 6 further comprising, sending the received network packet to a destination device when the generated connection validation cookie exactly matches with the connection identifier cookie.

10. The medium as set forth in claim 6 further comprising, extracting the connection identifier cookie prior from the subsequently received network packet to generating the connection validation cookie.

11. A network traffic manager apparatus, comprising memory comprising programmed instructions stored in the memory and one or more processors configured to be capable of executing the programmed instructions stored in the memory to:
   determine when a received network packet in an established connection between a client and a destination server comprises a connection identifier cookie within a TCP timestamp data field in the received network packet;
   generate a connection validation cookie based on at least data in the received network packet, when the determination indicates the received network packet includes the connection identifier cookie;

compare the connection identifier cookie against the generated connection validation cookie; and drop the received network packet when the comparison indicates the connection validation cookie fails to match the connection identifier cookie.

12. The device as set forth in claim 11 wherein the one or more processors are further configured to be capable of executing the programmed instructions stored in the memory to:

receive an initial network packet in the established connection;

generate the connection identifier cookie based on at least data associated with an initial network packet of the established connection; and transmit the connection identifier cookie to the client in the established connection.

13. The device as set forth in claim 11 wherein the connection validation cookie and the connection identifier cookie are each further generated based on a secret key.

14. The device as set forth in claim 11 wherein the one or more processors are further configured to be capable of executing the programmed instructions stored in the memory to send the received network packet to a destination device when the generated connection validation cookie exactly matches with the connection identifier cookie.

15. The device as set forth in claim 11 wherein the one or more processors are further configured to be capable of executing the programmed instructions stored in the memory to extract the connection identifier cookie prior from the subsequently received network packet to generating the connection validation cookie.

16. A network traffic management system, comprising one or more traffic management apparatuses, client devices, or server devices, the network traffic management system comprising memory comprising programmed instructions stored thereon and one or more processors configured to be capable of executing the stored programmed instructions to:

determine when a received network packet in an established connection between a client and a destination server comprises a connection identifier cookie within a TCP timestamp data field in the received network packet;

generate a connection validation cookie based on at least data in the received network packet, when the determination indicates the received network packet includes the connection identifier cookie;

compare the connection identifier cookie against the generated connection validation cookie; and drop the received network packet when the comparison indicates the connection validation cookie fails to match the connection identifier cookie.

17. The network traffic management system of claim 16 wherein the one or more processors are further configured to be capable of executing the programmed instructions stored in the memory to:

receive an initial network packet in the established connection;

generate the connection identifier cookie based on at least data associated with an initial network packet of the established connection; and transmit the connection identifier cookie to the client in the established connection.

18. The network traffic management system of claim 16 wherein the connection validation cookie and the connection identifier cookie are each further generated based on a secret key.

19. The network traffic management system of claim 16 wherein the one or more processors are further configured to be capable of executing the programmed instructions stored in the memory to send the received network packet to a destination device when the generated connection validation cookie exactly matches with the connection identifier cookie.

20. The network traffic management system of claim 16 wherein the one or more processors are further configured to be capable of executing the programmed instructions stored in the memory to extract the connection identifier cookie prior from the subsequently received network packet to generating the connection validation cookie.

* * * * *